US011178532B2

(12) United States Patent
Karaki et al.

(10) Patent No.: US 11,178,532 B2
(45) Date of Patent: Nov. 16, 2021

(54) TERMINAL APPARATUS, WIRELESS CONNECTION CONTROL METHOD, AND STORAGE MEDIUM STORING WIRELESS CONNECTION CONTROL PROGRAM

(71) Applicant: SEIKO EPSON CORPORATION, Tokyo (JP)

(72) Inventors: Kenichi Karaki, Matsumoto (JP); Iwane Ikeda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 16/558,885

(22) Filed: Sep. 3, 2019

(65) Prior Publication Data
US 2020/0077252 A1 Mar. 5, 2020

(30) Foreign Application Priority Data

Sep. 5, 2018 (JP) .............................. JP2018-165661

(51) Int. Cl.
*H04W 8/00* (2009.01)
*H04L 29/08* (2006.01)
*H04W 72/04* (2009.01)
*H04W 76/15* (2018.01)

(52) U.S. Cl.
CPC ............ *H04W 8/005* (2013.01); *H04L 67/16* (2013.01); *H04W 72/048* (2013.01); *H04W 76/15* (2018.02)

(58) Field of Classification Search
None
See application file for complete search history.

(56) References Cited

U.S. PATENT DOCUMENTS

| 2010/0067406 | A1  | 3/2010  | Suzuki   |           |
|--------------|-----|---------|----------|-----------|
| 2015/0186082 | A1* | 7/2015  | Lee      | G06F 3/1236 |
|              |     |         |          | 358/1.15  |
| 2016/0004489 | A1* | 1/2016  | Yamada   | G06F 3/1292 |
|              |     |         |          | 358/1.15  |
| 2016/0100394 | A1* | 4/2016  | Tachiwa  | H04W 4/70 |
|              |     |         |          | 370/329   |
| 2016/0295352 | A1* | 10/2016 | Dragomir | H04W 12/04 |
| 2017/0353981 | A1* | 12/2017 | Lee      | H04W 12/08 |
| 2018/0049257 | A1* | 2/2018  | Liu      | H04W 76/14 |
| 2019/0104454 | A1* | 4/2019  | Shibata  | H04W 76/30 |

FOREIGN PATENT DOCUMENTS

JP 2011-188518 9/2011

\* cited by examiner

*Primary Examiner* — Saumit Shah
(74) *Attorney, Agent, or Firm* — Workman Nydegger

(57) ABSTRACT

A terminal apparatus includes a first wireless communication unit and a controller. The first wireless communication unit conducts first wireless communication with a device under a first wireless communication scheme. The controller causes the first wireless communication unit to transmit setting information to the device; the setting information is required for the device to conduct second wireless communication under a second wireless communication scheme. When a predetermined display unit displays an entry screen through which the setting information is to be input, the controller breaks a connection of the first wireless communication between the first wireless communication unit and the device. When receiving the setting information through the entry screen, the controller establishes the connection of the first wireless communication between the first wireless communication unit and the device.

8 Claims, 6 Drawing Sheets

US 11,178,532 B2

TERMINAL APPARATUS, WIRELESS CONNECTION CONTROL METHOD, AND STORAGE MEDIUM STORING WIRELESS CONNECTION CONTROL PROGRAM

The present application is based on, and claims priority from JP Application Serial Number 2018-165661, filed Sep. 5, 2018, the disclosure of which is hereby incorporated by reference herein in its entirety.

BACKGROUND

1. Technical Field

The present disclosure relates to a terminal apparatus, a wireless connection control method, and a storage medium storing a wireless connection control program.

2. Related Art

JP-A-2011-188518 discloses a technique associated with the wireless connection between a multi-function printer (MFP) and an access point over a wireless local area network (LAN). The MFP has a display unit that displays the service set identifiers (SSIDs) of access points to which the MFP is connectable, and then a user operates an operation unit to select the SSID of the access point to which the MFP will connect.

In some case, a user has trouble setting wireless communication connections of MFPs and other devices. More user-friendly setting mechanisms are required accordingly.

SUMMARY

A terminal apparatus includes a first wireless communication unit and a controller. The first wireless communication unit conducts first wireless communication with a device under a first wireless communication scheme. The controller causes the first wireless communication unit to transmit setting information to the device; the setting information is required for the device to conduct second wireless communication under a second wireless communication scheme. When a predetermined display unit displays an entry screen through which the setting information is to be input, the controller breaks a connection of the first wireless communication between the first wireless communication unit and the device. When receiving the setting information through the entry screen, the controller establishes the connection of the first wireless communication between the first wireless communication unit and the device.

DESCRIPTION OF EXEMPLARY EMBODIMENTS

Some embodiments of the present disclosure will be described below with reference to the accompanying drawings. It should be noted that such embodiments are examples.

1. Schematic Configuration of System

Figure 1:
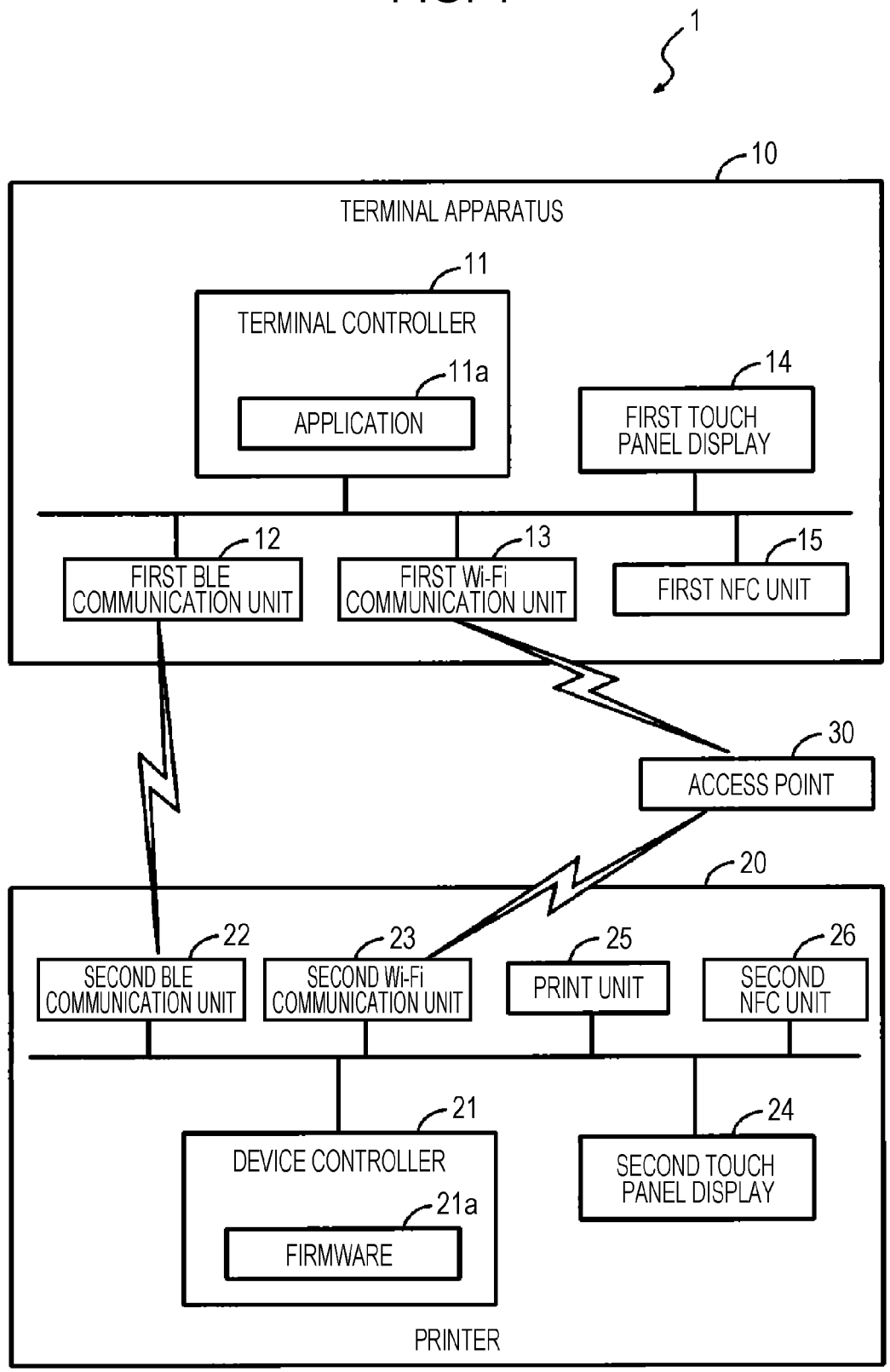
FIG. 1 illustrates a schematic configuration of a system according to some embodiments of the present disclosure.

FIG. 1 illustrates a schematic configuration of a system 1 according to some embodiments of the present disclosure. The system 1 includes a terminal apparatus 10 and a printer 20. Herein, the printer 20 is an example of a device. The terminal apparatus 10 and the printer 20 conduct first wireless communication with each other under a wireless communication scheme conforming to a Bluetooth (registered trademark) low energy (BLE) specification. In this embodiment, the wireless communication scheme conforming to the BLE specification corresponds to a first wireless communication scheme.

The terminal apparatus 10 conducts second wireless communication with an access point 30 over a wireless local area network (LAN) under a wireless communication scheme conforming to a Wi-Fi (registered trademark) specification, which is one of wireless LAN specifications. The printer 20 also conducts the second wireless communication with the access point 30 over the LAN under the wireless communication scheme conforming to the Wi-Fi specification. In this embodiment, the wireless communication scheme conforming to the Wi-Fi specification corresponds to a second wireless communication scheme.

The access point 30 functions as a wireless LAN router. Although a single access point 30 is illustrated in FIG. 1, one or more access points 30 may be further present around the terminal apparatus 10 and the printer 20. Likewise, one or more printers 20 may be further present.

The terminal apparatus 10 includes a terminal controller 11, a first BLE communication unit 12, a first Wi-Fi communication unit 13, a first touch panel display 14, and a first near field communication (NFC) unit 15. Under the BLE specification, the first BLE communication unit 12 can conduct the wireless communication with a communication partner at power lower than that of the first Wi-Fi communication unit 13, but its maximum communication distance is shorter. As an example, the first BLE communication unit 12 may be a chip or a module that conducts the wireless communication in conformity with the BLE specification. Herein, the first BLE communication unit 12 corresponds to a first wireless communication unit in a terminal apparatus.

The first Wi-Fi communication unit 13 conducts the wireless communication with a communication partner in conformity with the Wi-Fi specification. As an example, the first Wi-Fi communication unit 13 may be a chip or a module that conducts the wireless communication in conformity with the Wi-Fi specification. Herein, the first Wi-Fi communication unit 13 corresponds to a second wireless communication unit in the terminal apparatus. As an example, the first NFC unit 15 may be a chip or a module that conducts wireless communication in conformity with the NFC specification. In this case, the maximum communication distance of the first NFC unit 15 is shorter than that of the first BLE communication unit 12. In this embodiment, the wireless communication scheme conforming to the NFC specification corresponds to a third wireless communication scheme. Herein, the first NFC unit 15 corresponds to a third wireless communication unit in a terminal apparatus which conducts the third wireless communication with a communication partner present within a predetermined area under the third wireless communication scheme.

The first touch panel display 14 serves as a user interface, abbreviated below as a UI, that includes: a display that displays various information; and a touch panel that detects a touch on the display. Herein, the first touch panel display 14 corresponds to a display unit and an operation unit in the terminal apparatus 10. The operation unit does not necessarily have to be a touch panel and alternatively may be a hardware component, such as buttons, a keyboard, or a mouse, that receives a user's input.

The terminal controller 11 includes: an unillustrated processor such as a central processing unit (CPU); and unillustrated memory, such as read only memory (ROM) and random access memory (RAM). The terminal controller 11 executes programs stored in the memory. As an example, the memory may be electrically erasable programmable read only memory (EEPROM). The terminal controller 11 executes an application 11a, which is one of the programs stored in the memory, to control the operations of the first BLE communication unit 12, the first Wi-Fi communication unit 13, the first touch panel display 14, and the first NFC unit 15. Herein, the application 11a corresponds to a wireless connection control program. For example, the terminal controller 11 causes the first touch panel display 14 to display an image and receives a user's input through the first touch panel display 14. Moreover, the terminal controller 11 causes the first BLE communication unit 12 to conduct the first wireless communication, causes the first Wi-Fi communication unit 13 to conduct the second wireless communication, or causes the first NFC unit 15 to conduct the third wireless communication.

The terminal apparatus 10 may be a portable communication terminal apparatus, such as a smartphone, a tablet computer, or laptop personal computer.

The printer 20 includes a device controller 21, a second BLE communication unit 22, a second Wi-Fi communication unit 23, a second touch panel display 24, a print unit 25, and a second NFC unit 26. Under the BLE specification, the second BLE communication unit 22 can conduct the wireless communication with a communication partner at power lower than that of the second Wi-Fi communication unit 23, but its maximum communication distance is shorter. As an example, the second BLE communication unit 22 may be a chip or a module that conducts the wireless communication in conformity with the BLE specification.

The second Wi-Fi communication unit 23 conducts the wireless communication with a communication partner in conformity with the Wi-Fi specification. As an example, the second Wi-Fi communication unit 23 may be a chip or a module that conducts the wireless communication in conformity with the Wi-Fi specification. As an example, under the NFC specification, the second NFC unit 26 may be a chip or a module that conducts the wireless communication over a distance shorter than that of the second BLE communication unit 22.

The second touch panel display 24, which serves as a UI, includes: a display that displays various information; and a touch panel that detects a touch on the display. The print unit 25 transports an unillustrated print medium and prints an image on the print medium.

The device controller 21 includes: an unillustrated processor such as a CPU; and unillustrated memory such as ROM and RAM. The device controller 21 executes programs stored in the memory. The device controller 21 executes a firmware 21a, which is a program stored in the memory, to control the operations of the second BLE communication unit 22, the second Wi-Fi communication unit 23, the second touch panel display 24, the print unit 25, and the second NFC unit 26. For example, the device controller 21 causes the second touch panel display 24 to display an image and receives a user's input through the second touch panel display 24. The device controller 21 performs an imaging process on an image based on print data and causes the print unit 25 to print the image on a print medium. The device controller 21 causes the second BLE communication unit 22 to conduct the first wireless communication, causes the second Wi-Fi communication unit 23 to conduct the second wireless communication, and causes the second NFC unit 26 to conduct the third wireless communication.

The printer 20 may be an MFP that incorporates: the print function of the print unit 25; the reading function of a scanner; the communication function of a facsimile communication unit; and others. The first NFC unit 15 in the terminal apparatus 10 and the second NFC unit 26 in the printer 20 are essential components for a "second embodiment" that will be described later, but may be optional components for other embodiments.

2. First Embodiment

A first embodiment of the system 1 will be described below. In the first embodiment, a user operates the terminal apparatus 10 so as to connect the printer 20 to the wireless LAN. As a precondition of the first embodiment, the terminal apparatus 10 has established the second wireless communication with the access point 30. In other words, the terminal apparatus 10 has been connected to the wireless LAN on which the access point 30 relays data.

Figure 2:
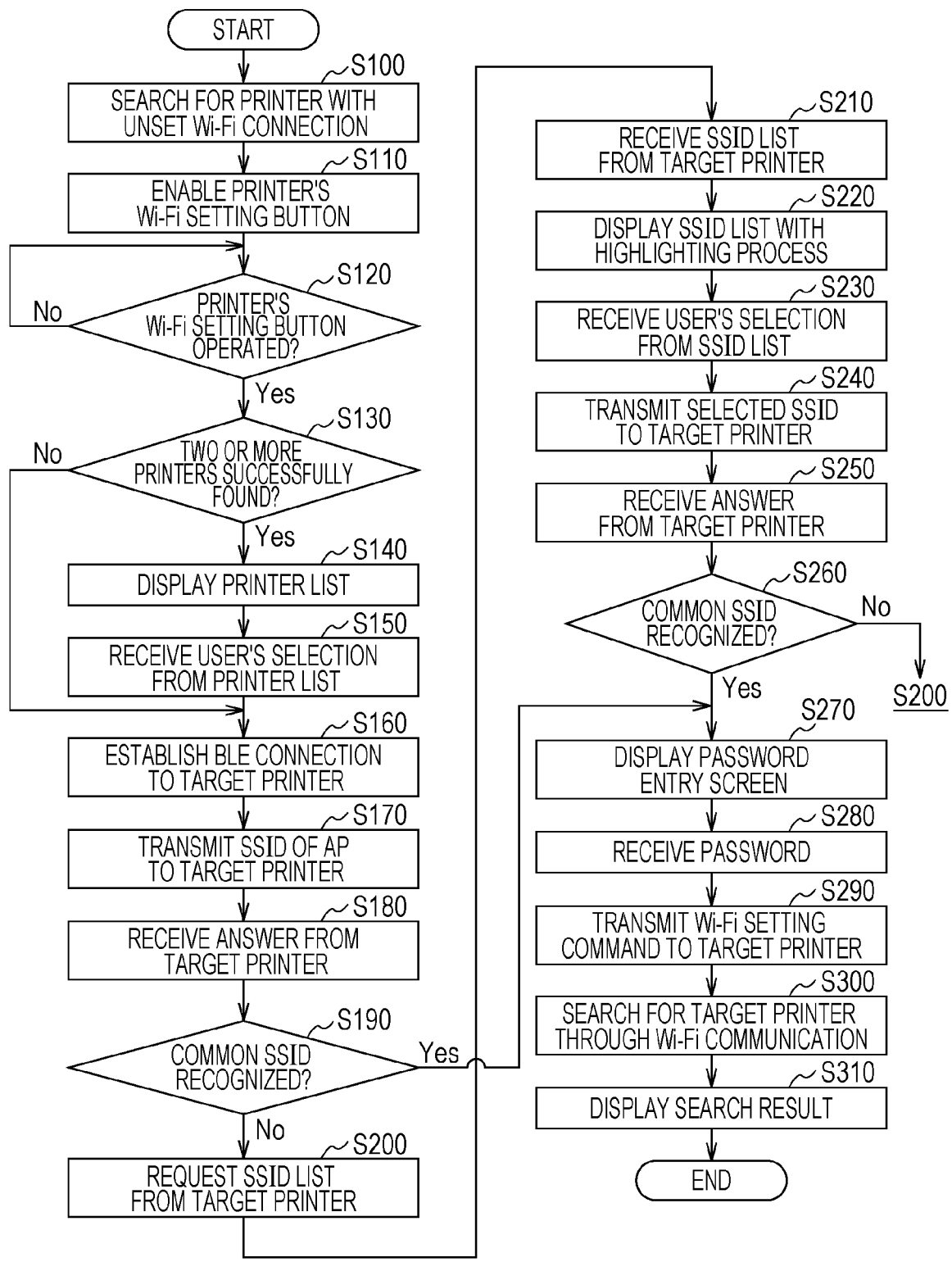
FIG. 2 is a flowchart of a process according to first and second embodiments of the present disclosure in which the terminal apparatus controls a wireless connection.
Figure 3:
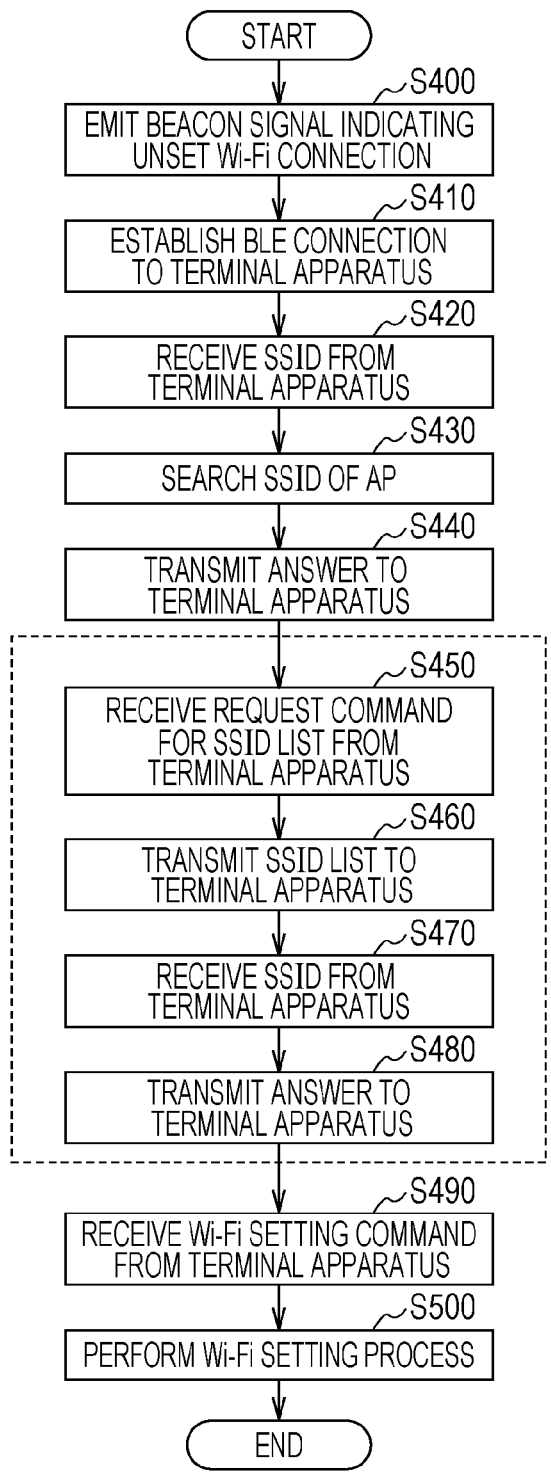
FIG. 3 is a flowchart of a process according to the first and second embodiments in which the printer controls a wireless connection.

FIG. 2 is a flowchart of a process in which the terminal controller 11 in the terminal apparatus 10 controls the wireless connection in conformity with the application 11a. Herein, some steps in FIG. 2 correspond to those of a wireless connection control method. FIG. 3 is a flowchart of a process in which the device controller 21 in the printer 20 controls the wireless connection in conformity with the firmware 21a.

When the printer 20 is not connected to the wireless LAN, in other words, when the Wi-Fi connection of the printer 20 is not set, the device controller 21 causes the second BLE communication unit 22 to emit a Beacon signal conforming to the BLE specification to nifty that the Wi-Fi connection is not set, as at Step S400. This Beacon signal is referred to as the advertising packet. Hereinafter, the Beacon signal that the second BLE communication unit 22 emits at Step S400 is also referred to as the BLE Beacon signal. The second BLE communication unit 22 may emit the BLE Beacon signal at predetermined time intervals.

The Beacon signal that the second BLE communication unit 22 emits at Step S400 contains various identification information and device name of the printer 20. Examples of the identification information include: specific identification data (ID) that indicates the printer 20 is a target device to which the terminal apparatus 10 subjects Wi-Fi setting control; an address uniquely assigned to the second BLE communication unit 22; and a media access control (MAC) address uniquely assigned to the second Wi-Fi communication unit 23. The identification information, the device name, and other information contained in the BLE Beacon signal are referred collectively to below as the BLE Beacon information.

The user of the terminal apparatus 10 operates the first touch panel display 14 to activate the application 11a. When activated, the application 11a causes the first touch panel display 14 to display a UI screen. When the user performs a predetermined operation through the UI screen, the application 11a instructs the terminal controller 11 in the terminal apparatus 10 to search for a printer 20 whose Wi-Fi connection is not set. This instruction triggers the terminal apparatus 10 to perform the process of the flowchart in FIG. 2.

At Step S100, the terminal controller 11 searches for a printer 20 nearby whose Wi-Fi connection is not set. In this case, the terminal controller 11 causes the first BLE communication unit 12 to sense the BLE Beacon signal.

If the first BLE communication unit 12 senses the BLE Beacon signal at Step S100, at Step S110, the terminal controller 11 causes the first touch panel display 14 to enable a printer's Wi-Fi setting button on the UI screen.

Figure 4A:
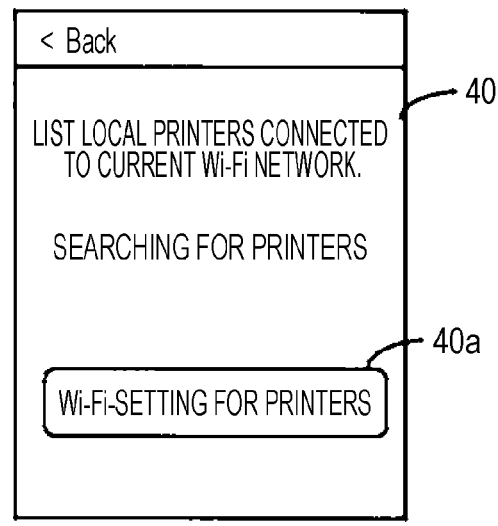
FIG. 4A illustrates a UI screen in the terminal apparatus.

FIGS. 4A to 5D each illustrate an example of the UI screen that the terminal controller 11 causes the first touch panel display 14 to display in conformity with the application 11a. The reference numerals 40, 41, 42, 43, 44, 45, and 46 in FIGS. 4A and 5D denote respective UI screens. At Step S110, the terminal controller 11 enables a printer's Wi-Fi setting button 40a on the UI screen 40, as illustrated in FIG. 4A. If the terminal apparatus 10 does not sense the BLE Beacon signal at Step S100, the terminal controller 11 may repeat the process at Step S100 or terminate the process of the flowchart in FIG. 2. In this embodiment, the description will be given below regarding a case where the terminal apparatus 10 senses the BLE Beacon signals from one or more printers 20.

At Step S120, the terminal controller 11 determines whether the user operates the printer's Wi-Fi setting button 40a, for example, by tapping or clicking it. If the user operates the printer's Wi-Fi setting button 40a, the terminal controller 11 selects "Yes" and proceeds to the process at Step S130.

At Step S130, the terminal controller 11 determines whether the terminal apparatus 10 has successfully searched for a plurality of printers 20 whose Wi-Fi connections are not set. If the terminal apparatus 10 senses the BLE Beacon signals from a plurality of printers 20 at Step S100, the terminal controller 11 selects "Yes" and proceeds to the process at Step S140. If the terminal apparatus 10 senses the BLE Beacon signal from a single printer 20 at Step S100, the terminal controller 11 selects "No" and proceeds to the process at Step S160.

Figure 4B:
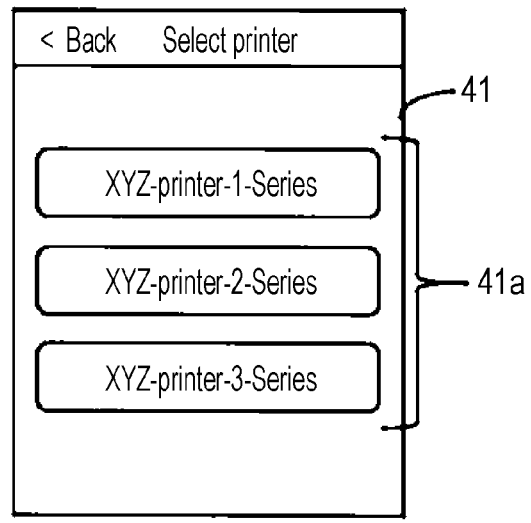
FIG. 4B illustrates a UI screen in the terminal apparatus.

At Step S140, the terminal controller 11 causes the first touch panel display 14 to display the list of the printers 20 found at S100. In this case, as illustrated in FIG. 4B, the first touch panel display 14 displays a UI screen 41 that contains a printer list 41a displayed at Step S140; the printer list 41a contains the device names of the printers 20. The device names in the printer list 41a are extracted from the BLE Beacon information contained in the BLE Beacon signals from the printers 20 found at Step S100. In this case, the printer list 41a on the UI screen 41 contains three printers 20 whose Wi-Fi connections are not set.

The terminal controller 11 may create the printer list 41a on the UI screen 41 in such a way that the printers 20 are arranged from the top to the bottom in decreasing order of the distance to the terminal apparatus 10. By creating the printer list 41a in this manner, the user is highly likely to select the printer 20 positioned closest to the terminal apparatus 10. To determine the distance between the terminal apparatus 10 and each printer 20, the terminal controller 11 may employ any given method. As an example, the terminal controller 11 may estimate the distance between the terminal apparatus 10 and a printer 20 by comparing between the received signal strength indication (RSSI) of the BLE Beacon signal that has been received from the printer 20 at Step S100 and a predetermined threshold. The terminal controller 11 may cause the first touch panel display 14 to further display icons adjacent to the device names in the printer list 41a; the icons indicate the RSSIs of the BLE Beacon signals. Displaying the icons in this manner can facilitate the user's realization.

At Step S150, the terminal controller 11 receives a user's selection from the list of the printers 20 displayed at Step S140. In this case, the user may select one of the device names in the printer list 41a on the UI screen 41 through the first touch panel display 14. Hereinafter, the printer 20 selected by the user at Step S150 is referred to as the "target printer 20". If having selected "No" at Step S130, the terminal controller 11 designates the printer 20 found at Step S100 as the target printer 20.

At Steps S160 and S410, both the terminal apparatus 10 and the target printer 20 establish the connection, referred to below as the BLE connection, therebetween in order to conduct the first wireless communication. In this case, the terminal controller 11 causes the first BLE communication unit 12 to transmit a predetermined connection request to the second BLE communication unit 22 in the target printer 20 under the BLE specification. In response to this connection request, the device controller 21 in the target printer 20 causes the second BLE communication unit 22 to transmit the answer to the first BLE communication unit 12. As a result of the interaction between the terminal apparatus 10 and the target printer 20 under the BLE specification, the BLE connection is established.

In this embodiment, the terminal controller 11 extracts the identification information from the BLE Beacon information contained in the BLE Beacon signal transmitted from the target printer 20 and converts the identification information by using a predetermined equation. Then, the terminal controller 11 adds the converted identification information to a BLE connection request and causes the first BLE communication unit 12 to transmit the BLE connection request to the second BLE communication unit 22 in the target printer 20. When the target printer 20 receives the BLE connection request, the device controller 21 extracts the identification information from the BLE connection request and determines whether the extracted identification information is proper. More specifically, the device controller 21 uses the equation to convert the identification information that has been added to the BLE Beacon information contained in the BLE Beacon signal transmitted from the second BLE communication unit 22. Then, if this converted identification information matches the identification information contained in the BLE connection request, the device controller 21 can determine that the extracted identification information is proper. When determining that the extracted identification information is proper, the device controller 21 transmits the answer to the terminal controller 11 in the terminal apparatus 10 in response to the connection request. In this way, the BLE connection is established between the terminal apparatus 10 and the target printer 20. After the establishment of the BLE connection, the second BLE communication unit 22 in the target printer 20 stops emitting the BLE Beacon signal.

At Step S170, the terminal controller 11 causes the first BLE communication unit 12 to transmit, to the second BLE communication unit 22 in the target printer 20, the service set identifier (SSID) of the access point 30 to which the first Wi-Fi communication unit 13 is connected. The SSID is a network identifier of the access point 30. In FIGS. 2 and 3, the access point is abbreviated as the AP. The SSID of the access point 30 to which the first Wi-Fi communication unit 13 is connected corresponds to the SSID which the first Wi-Fi communication unit 13 is currently using to conduct the second wireless communication with the access point 30. In this case, the SSID that the terminal controller 11 has transmitted to the device controller 21 in the target printer 20 at Step S170 is referred to below as the "first SSID".

At Step S420, the device controller 21 in the target printer 20 receives the first SSID from the terminal apparatus 10 via the second BLE communication unit 22. The communication conducted between the terminal apparatus 10 and the target printer 20 at Steps S170, S180, S200, S210, S240, S250, and S290 in FIG. 2 and at Steps S420 and S440 to S490 in FIG. 3 corresponds to the first wireless communication conducted between the first BLE communication unit 12 and the second BLE communication unit 22 via the BLE connection.

At Step S430, the device controller 21 searches the SSIDs of access points 30 present nearby. The access point 30 emits a Beacon signal in a format defined by the Wi-Fi specification, at preset time intervals; this Beacon signal contains the SSID and a security type. The Beacon signal emitted from the access point 30 is referred to below as the Wi-Fi Beacon signal. The device controller 21 causes the second Wi-Fi communication unit 23 to sense the Wi-Fi Beacon signal. The timing of performing the process at Step S430 corresponds to one timing of searching for an access point 30 having a predetermined SSID present around a printer 20 whose Wi-Fi connection is not set.

At Step S440, in response to the first SSID received at Step S420, the device controller 21 transmits the answer to the terminal controller 11 in the terminal apparatus 10. The answer transmitted at Step S440 directly or indirectly indicates whether the printer 20 has recognized the first SSID received at Step S420 as one of the SSIDs of access points 30 present nearly.

More specifically, the device controller 21 extracts the SSID and a security type from the Wi-Fi Beacon signal sensed by the second Wi-Fi communication unit 23 when searching SSIDs at Step S430 or some other step. The security type may be an encryption scheme, such as the wired equivalent privacy (WEP), the temporal key integrity protocol (TKIP), the advanced encryption standard (AES), or a similar known scheme. If the SSID found at Step S430 or some other step matches the first SSID received at Step S420, the device controller 21 transmits the security type related to the first SSID to the terminal apparatus 10 as the answer at Step S440. If the SSID found at Step S430 or some other step does not match the first SSID received at Step S420, the device controller 21 fails to recognize the security type related to the first SSID. In this case, at Step S440, the device controller 21 transmits the answer that it fails to recognize the security type related to the first SSID to the terminal controller 11 in the terminal apparatus 10.

At Step S180, the terminal controller 11 in the terminal apparatus 10 receives the answer to the first SSID transmitted at Step S170 from the device controller 21 in the target printer 20. At Step S190, the terminal controller 11 determines whether both the terminal apparatus 10 and the target printer 20 recognize a common SSID, or the first SSID. When the answer received at Step S180 indicates that the device controller 21 has recognized the security type related to the first SSID, the terminal controller 11 selects "Yes". In which case, the terminal controller 11 skips the process at Steps S200 to S260 and proceeds to the process at Step S270. When the answer received at Step S180 indicates that the device controller 21 has not recognized the security type related to the first SSID, the terminal controller 11 selects "No" and proceeds to the process at Step S200.

Figure 4C:
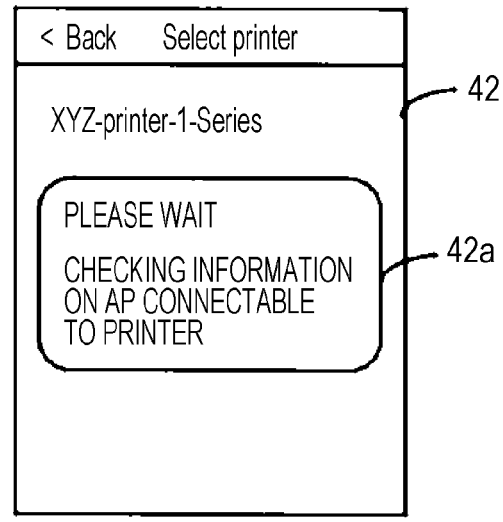
FIG. 4C illustrates a UI screen in the terminal apparatus.

FIG. 4C illustrates a UI screen 42 displayed when "No" is selected at Step S130 or after the user has selected a printer 20 in the printer list 41a displayed at Step S140. The UI screen 42 contains a message 42a that the search for an access point 30 to which the target printer 20 is connectable via Wi-Fi is being made. When the process at Step S270 is performed right after the process at Step S190, the terminal controller 11 keeps displaying the UI screen 42 until the process at Step S270 has been completed. When the process at Step S200 is performed right after the process at Step S190, the terminal controller 11 keeps displaying the UI screen 42 until the process at Step S220 has been completed.

At Step S200, the terminal controller 11 requests the SSID list of recognized access points 30 from the device controller 21 in the target printer 20. In this case, the terminal controller 11 transmits a request command for the SSID list to the device controller 21 in the target printer 20.

At Step S450, the device controller 21 in the target printer 20 receives the request command from the terminal controller 11 in the terminal apparatus 10. It should be noted that the process at Steps S450 to S480 surrounded by the broken line in FIG. 3 which is performed by the target printer 20 is related to the process at Steps S200 to S260 performed by the terminal apparatus 10. When the terminal apparatus 10 performs the process at Step S270 right after the process at Step S190, the target printer 20 may skip the process at Steps S450 to S480.

At Step S460, the device controller 21 transmits the SSID list to the terminal controller 11 in the terminal apparatus 10. In this case, the device controller 21 generates data in a list format containing the SSIDs of the access points 30 that have been found until the timing of Step S460. Then, the device controller 21 transmits the data to the terminal controller 11 in the terminal apparatus 10 as the SSID list.

Figure 5A:
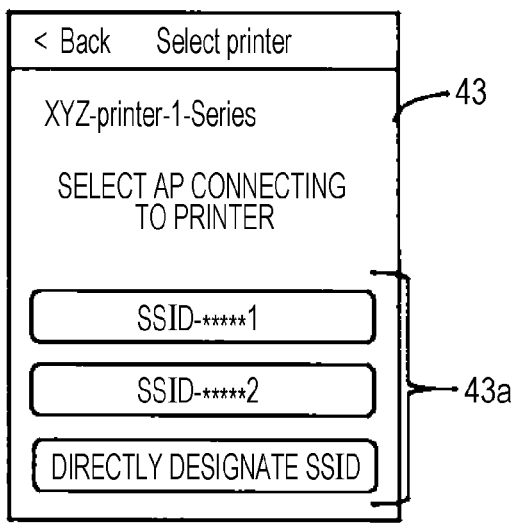
FIG. 5A illustrates a UI screen in the terminal apparatus.

At Step S210, the terminal controller 11 in the terminal apparatus 10 receives the SSID list from the device controller 21 in the target printer 20. At Step S220, the terminal controller 11 causes the first touch panel display 14 to display the SSID list received at Step S210. FIG. 5A illustrates a UI screen 43, which is an example of the UI screen displayed at Step S220; the UI screen 43 contains an SSID list 43a.

When displaying the SSID list at Step S220, the terminal controller 11 performs a highlighting process. In the highlighting process, an SSID in the SSID list which has a specific relationship with the first SSID is distinguished from the others. This SSID is referred to below as a "second SSID". More specifically, the second SSID may be displayed on the top of the SSID list.

There are cases where a single access point 30 possesses a plurality of SSIDs. In this embodiment, the relationship between SSIDs possessed by a single access point 30 is defined as the specific relationship. The access point 30 possesses both the first SSID and the second SSID, and the first Wi-Fi communication unit 13 is connected to the access point 30 based on the first SSID. In this case, if the SSID list received at Step S210 contains the second SSID, at Step S220, the terminal controller 11 causes the first touch panel display 14 to display the SSID list with the second SSID highlighted.

There are cases where the access point 30 possess SSIDs used to identify wireless LANs having frequency bands of 5.0 and 2.4 GHz. Moreover, in many cases, a plurality of SSIDs possessed by a single access point 30 which are related to different frequency bands usually have similar letter strings. If the letter string of a certain SSID in the SSID list differs from that of the first SSID but this difference is attributed to their frequency bands, the terminal controller 11 designates this SSID as the second SSID and causes the first touch panel display 14 to display the SSID list with the second SSID highlighted.

As an example, the first Wi-Fi communication unit 13 in the terminal apparatus 10 is connected to the access point 30 based on the first SSID related to the frequency band of 5 GHz, and the access point 30 has another SSID related to the frequency band of 2.4 GHz. Furthermore, the second Wi-Fi communication unit 23 in the target printer 20 has searched for the SSID related to the frequency band of 2.4 GHz at Step S430 or some other step. In this case, the SSID list generated by the device controller 21 in the target printer 20 may contain the second SSID having a specific relationship with the first SSID. If an SSID contained in the SSID list satisfies at least one of conditions 1 to 4 described below, the terminal controller 11 designates this SSID as the second SSID.

[Condition 1]

When the last letter "-a" in the letter string of an SSID is replaced with the letter "-g" or when the last letter "_A" in the letter string of the SSID is replaced with the letter "_G", if the replaced letter string matches the letter string of the first SSID, this SSID can be designated as the second SSID.

[Condition 2]

When the middle letter "-a-" in the letter string of an SSID is replaced with the letter "-g-" or when the middle letter "-A_" in the letter string of the SSID is replaced with the letter "-G_", if the replaced letter string matches the letter string of the first SSID, this SSID can be designated as the second SSID.

[Condition 3]

When the middle letter "2G" in the letter string of an SSID is replaced with the letter "5G", if the replaced letter string matches the letter string of the first SSID, this SSID can be designated as the second SSID.

[Condition 4]

When the last letter "-5G" in the letter string of an SSID is deleted, if this letter string matches the letter string of the first SSID, this SSID can be designated as the second SSID.

As described above, if the letter string of the first SSID matches the letter string of an SSID in the SSID list except letters indicating respective frequency bands, the terminal controller 11 designates the SSID in the SSID list as the second SSID. Examples of letters indicating frequency bands include "-a", "_A", "-g", "_G", "-a-", "-A_", "-g-", "-G_", "2G", "5G", and "-5G". However, a method for identifying the second SSID from the SSID list does not necessarily have to satisfy the conditions 1 to 4.

In FIG. 5A, the UI screen 43 contains a plurality of SSIDs, including "SSID-***1" and "SSID-*2", in the SSID list 43a. Among these, "SSID-*1" is listed on the top. Therefore, "SSID-***1" can be designated as an example of the second SSID having a specific relationship with the first SSID.

In the above highlighting process, the terminal controller 11 does not necessarily have to describe the second SSID on the top of the SSID list as described above. For example, the terminal controller 11 may display the second SSID with a larger font size than that of any other SSID or with a different font color. Alternatively, the terminal controller 11 may cause the first touch panel display 14 to describe only the second SSID in the SSID list, in which case the user is less likely to select any other SSID.

At Step S230, the terminal controller 11 receives a user's selection from the SSID list that has been displayed at Step S220. In this case, the user selects one of the SSIDs in the SSID list 43a on the UI screen 43 through the first touch panel display 14. Hereinafter, the SSID that the terminal controller 11 has received as the selection at Step S230 is referred to as the "selected SSID". In this case, the user is highly likely to select the second SSID highlighted in the above manner in the SSID list 43a. Optionally, the terminal controller 11 may cause the first touch panel display 14 to display an entry field or a button on the UI screen 43 through which the user inputs the letter string of the selected SSID. The description will be given below regarding a case where the user has selected the second SSID from the SSID list.

The process at Steps S240 to S260 in FIG. 2 is similar to the process at Steps S170 to S190. In which case, the first SSID used at Steps S170 to S190 should be read as the selected SSID at Steps S240 to S260. Likewise, the process at Steps S470 and S480 in FIG. 3 is similar to the process at Steps S420 and S440. In which case, the first SSID at Steps S420 and S440 should be read as the selected SSID at Steps S470 and S480. At Step S240, the terminal controller 11 transmits the selected SSID to the device controller 21 in the target printer 20. At Step S470, the device controller 21 receives the selected SSID from the terminal controller 11 in the terminal apparatus 10. In response to the selected SSID received at Step S470, at Step S480, the device controller 21 transmits the answer to the terminal apparatus 10. The answer transmitted at Step S480 directly or indirectly indicates whether the target printer 20 has recognized the selected SSID received at Step S470 as one of SSIDs of access points 30 present nearby.

If the selected SSID received at Step S470 matches one of the recognized SSIDs, the device controller 21 transmits, as the answer, the security type related to the selected SSID to the terminal controller 11 in the terminal apparatus 10 at Step S480. If the SSID received at Step S470 does not match any of the recognized SSIDs, the device controller 21 fails to recognize the security type related to the selected SSID. In this case, at Step S480, the device controller 21 transmits the answer that it fails to recognize the security type related to the selected SSID to the terminal controller 11 in the terminal apparatus 10.

At Step S250, the terminal controller 11 in the terminal apparatus 10 receives the answer from the device controller 21 in the target printer 20 which responds to the selected SSID that has been transmitted to the target printer 20 at Step S240. At Step S260, the terminal controller 11 determines whether both the terminal apparatus 10 and the target printer 20 recognize a common SSID, or the selected SSID. When the answer received at Step S250 indicates the security type related to the selected SSID, the terminal controller 11 selects "Yes" and proceeds to the process at Step S270. When the answer received at Step S250 does not indicate the security type related to the selected SSID, the terminal controller 11 selects "No" and returns to the process at Step S200.

As can be understood from the above description, the selected SSID is an SSID that has been selected by the user from the SSID list generated by the target printer 20. Therefore, the terminal controller 11 selects "Yes" at Step S260 and proceeds to the process at Step S270. Optionally, the terminal controller 11 may skip the process at Steps S240 to S260 in the flowchart of FIG. 2, and the device controller 21 may skip the process at Steps S470 and S480 in the flowchart of FIG. 3.

Figure 5B:
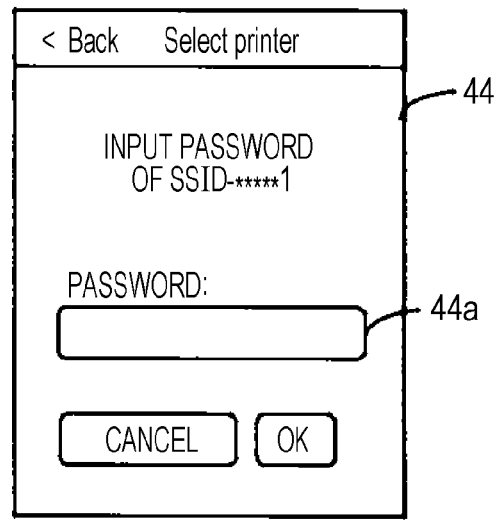
FIG. 5B illustrates a UI screen in the terminal apparatus.

At Step S270, the terminal controller 11 causes the first touch panel display 14 to display an entry screen through which the user inputs setting information required to conduct the second wireless communication with the target printer 20. The setting information may be a password for use in connecting to the access point 30. FIG. 5B illustrates a UI screen 44, which is the UI screen displayed at Step S270. The user can input the password through a password entry field 44a on the UI screen 44. The terminal controller 11 causes the first touch panel display 14 to display the selected SSID and the password entry field 44a together on the UI screen 44. Displaying them in this manner can encourage the user to input the password required to connect to the access point 30 having the selected SSID. If proceeding to the Step S270 right after the process at Step S190, the terminal controller 11 displays the first SSID and the password entry field 44a together on the UI screen 44.

At Step S280, the terminal controller 11 receives the password, as the setting information, through the entry screen that has been displayed at Step S270. In this case, the user inputs the password in the password entry field 44a on the UI screen 44. In some cases, the password required to connect to the access point 30 can be read from a label, for example, attached on the bottom of the housing of the access point 30. The description will be given regarding a case where the user has known the password.

At Step S290, the terminal controller 11 generates a Wi-Fi setting command containing the SSID and the password required to connect to the access point 30 and transmits the generated Wi-Fi setting command to the target printer 20. The Wi-Fi setting command is used to instruct the target printer 20 to connect to the access point 30, namely, set the Wi-Fi connection. In the Wi-Fi setting command, the SSID corresponds to the selected SSID, and the password corresponds to the password that has been received at Step S280. If having proceeded to Step S270 right after the process at Step S190, the terminal controller 11 adds the first SSID and the password received at Step S280 to the Wi-Fi setting command.

At Step S490, the device controller 21 in the target printer 20 receives the Wi-Fi setting command from the terminal controller 11 in the terminal apparatus 10. At Step S500, the device controller 21 performs a Wi-Fi setting process, based on the Wi-Fi setting command that has been received at Step S490. More specifically, the device controller 21 passes the SSID and the password contained in the Wi-Fi setting command to the second Wi-Fi communication unit 23 and then causes the second Wi-Fi communication unit 23 to connect to the access point 30 based on the SSID and the password, under the Wi-Fi specification. After that, the device controller 21 in the printer 20 concludes the process in the flowchart of FIG. 3.

At Step S300, the terminal controller 11 in the terminal apparatus 10 causes the first Wi-Fi communication unit 13 to start conducting the second wireless communication via the access point 30 under the Wi-Fi specification, and then searches for the target printer 20. For example, the terminal controller 11 causes the first Wi-Fi communication unit 13 to conduct the second wireless communication and to search for a communication partner over a predetermined period such as several minutes by using the MAC address of the second Wi-Fi communication unit 23 in the target printer 20. At Step S310, the terminal controller 11 causes the first touch panel display 14 to display the search result that has been obtained at Step S300. After that, the terminal controller 11 in the terminal apparatus 10 concludes the process in the flowchart of FIG. 2.

When the device controller 21 in the printer 20 sets the second SSID to the selected SSID, the first Wi-Fi communication unit 13 in the terminal apparatus 10 connects to the access point 30 based on the first SSID, whereas the second Wi-Fi communication unit 23 in the target printer 20 connects to the access point 30 based on the second SSID. The first SSID and the second SSID are different SSIDs possessed by the same access point 30. For example, the first SSID is related to a frequency band of 5 GHz, whereas the second SSID is related to a frequency band of 2.4 GHz. An access point 30 that possesses a plurality of SSIDs having different frequency bands relays data through wireless communication, based on the SSIDs. If the second SSID and the password are successfully set for the target printer 20, the terminal controller 11 can search for the target printer 20 at Step S300. If the first SSID is set for the target printer 20, both the first Wi-Fi communication unit 13 in the terminal apparatus 10 and the target printer 20 in the second Wi-Fi communication unit 23 connect to the access point 30, based on the first SSID. In this case, the terminal controller 11 searches for the target printer 20 at Step S300.

Figure 5C:
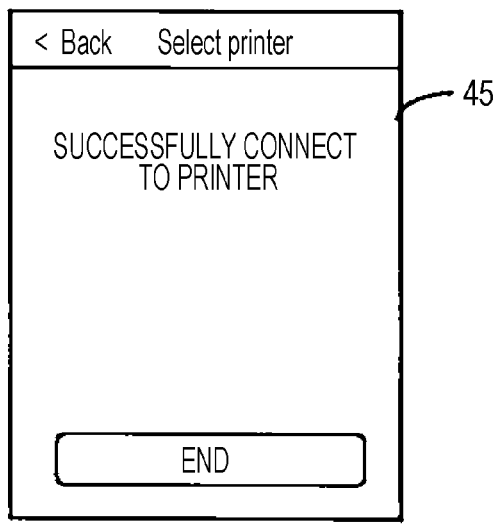
FIG. 5C illustrates a UI screen in the terminal apparatus.
Figure 5D:
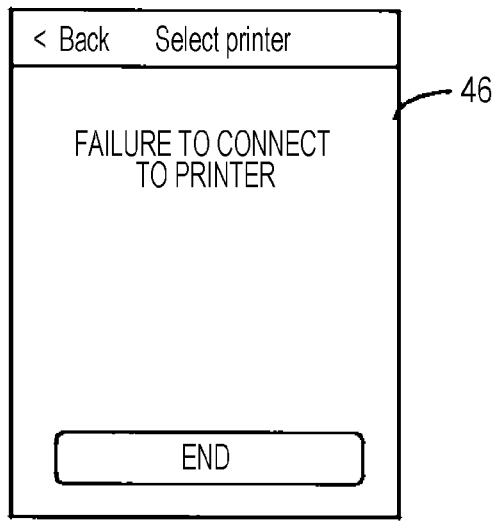
FIG. 5D illustrates a UI screen in the terminal apparatus.

FIG. 5C illustrates a UI screen 45, which is the UI screen displayed at Step S310 when the terminal controller 11 has successfully found the target printer 20 at Step S300. If the terminal controller 11 has successfully found the target printer 20 at Step S300, the terminal apparatus 10 can conduct the second wireless communication with the target printer 20 via the access point 30 under the Wi-Fi specification. Thus, the terminal controller 11 causes the first touch panel display 14 to display the UI screen 45 containing a message that the connection between the terminal apparatus 10 and the target printer 20 is successfully established under the Wi-Fi specification. FIG. 5D illustrates a UI screen 46, which is the UI screen displayed at Step S310 when the terminal controller 11 has failed to search for the target printer 20 at Step S300. Thus, the terminal controller 11 causes the first touch panel display 14 to display the UI screen 46 containing a message that the connection between the terminal apparatus 10 and the target printer 20 cannot be established under the Wi-Fi specification.

When the first BLE communication unit 12 in the terminal apparatus 10 conducts the first wireless communication with the second BLE communication unit 22 in the printer 20 through the BLE connection, data in a format conforming to a general-purpose network management protocol may be exchanged therebetween. More specifically, the terminal controller 11 may generate a packet that contains data in a format conforming to a simple network management protocol (SNMP), as data to be transmitted to the printer 20 at Steps S170, S200, S240, and S290, for example. Then, the terminal controller 11 may cause the first BLE communication unit 12 to suitably convert the generated packet into data in a format that supports the first wireless communication, and may cause the first BLE communication unit 12 to transmit the data to the second BLE communication unit 22 in the printer 20. Likewise, the device controller 21 may generate a packet that contains data in a format conforming to the SNMP, as data to be transmitted to the terminal apparatus 10 at Steps S440, S460, and S480, for example. Then, the device controller 21 may cause the second BLE communication unit 22 to suitably convert the generated packet into data in a format that supports the first wireless communication, and may cause the second BLE communication unit 22 to transmit the data to the first BLE communication unit 12 in the terminal apparatus 10.

According to this embodiment, a terminal apparatus 10 includes: a first wireless communication unit that conducts first wireless communication with a device under a first wireless communication scheme; and a second wireless communication unit that connects to an access point 30 based on an SSID of the access point 30 under a second wireless communication scheme. The access point 30 supports the second wireless communication scheme. The terminal apparatus 10 further includes a terminal controller 11 that causes a predetermined display unit to display an SSID list. The SSID list is acquired by the device as a result of searching for the access point 30 that supports the second wireless communication scheme and then is transmitted from the device to the first wireless communication unit. In addition, the terminal controller 11 causes the device to connect to the access point 30 based on an SSID selected from the SSID list, under the second wireless communication scheme. The access point 30 possesses a first SSID and a second SSID. When the second wireless communication unit is connected to the access point 30 based on the first SSID and the second SSID is contained in the SSID list, the terminal controller 11 causes the display unit to display the SSID list with the second SSID highlighted. With this configuration, the terminal apparatus 10 can encourage a user to select, from the SSID list, the second SSD having a specific relationship with the first SSID. Consequently, the terminal apparatus 10 encourages the user to select a proper access point 30 to which the device connects, thereby easily establishing a second wireless communication between the terminal apparatus 10 and the device via the access point 30.

According to this embodiment, when an SSID based on which the second wireless communication unit connects to the access point 30 and another SSID contained in the SSID list are expressed by different letter strings in accordance with respective frequency bands, the terminal controller 11 may designate the SSID based on which the second wireless communication unit connects to the access point 30 as a first SSID and may also designate the SSID contained in the SSID list as a second SSID. When the first SSID and the second SSID are expressed by different letter strings in accordance with their frequency bands, the terminal controller 11 may cause the display unit to display the SSID list with the second SSID highlighted. With this configuration, the terminal apparatus 10 can identify a second SSID having a specific relationship with a first SSID, based on the fact that a plurality of SSIDs possessed by a single access point 30 are expressed by different letter strings in accordance with their frequency bands.

According to this embodiment, when an SSID based on which the second wireless communication unit connects to the access point 30 and another SSID contained in the SSID list are expressed by the same letter strings except letters indicating respective frequency bands, the terminal controller 11 may designate the SSID based on which the second wireless communication unit connects to the access point 30 as a first SSID and may designate the SSID contained in the SSID list as a second SSID. When the first SSID and the second SSID are expressed by the same letter strings except letters indicating respective frequency bands, the terminal controller 11 may cause the display unit to display the SSID list with the second SSID highlighted. With this configuration, the terminal apparatus 10 can facilitate the selection of a second SSID having a specific relationship with a first SSID.

According to this embodiment, the terminal controller 11 may cause the display unit to display the second SSID in the SSID list at a higher position than any other SSID. This configuration can encourage a user to select, from the SSID list, a second SSID having a specific relationship with a first SSID.

According to this embodiment, the terminal controller 11 may cause the display unit to display an entry screen through which a password is to be input and cause the first wireless communication unit to transmit, to the device, the password received through the entry screen and a selected SSID selected from the SSID list. The password may be required to connect to the access point 30 having the selected SSID selected from the SSID list under the second wireless communication scheme. With this configuration, the terminal apparatus 10 can pass the selected SSID selected from the SSID list and the password received through the entry screen to the device through the first wireless communication, and can cause the device to connect to the access point 30 under the second wireless communication scheme.

According to this embodiment, the first wireless communication unit may conduct the first wireless communication with the device directly, namely, without using a relay apparatus. In the above description, the first wireless communication unit conducts the first wireless communication under a wireless communication scheme conforming to the BLE specification. However, the first wireless communication unit may conduct the first wireless communication under a wireless communication scheme conforming to any other specifications, including Bluetooth and infrared wireless communication specifications.

3. Second Embodiment

Next, a second embodiment of the present disclosure will be described below. This second embodiment is performed together with the foregoing first embodiment. When a plurality of printers 20 are present around a terminal apparatus 10, a user of the terminal apparatus 10 determines which printer 20 is to be subjected to a wireless connection control, namely, which printer 20 is to be set to a target printer 20. For example, two printers 20, or a first printer and a second printer, are present, and a user is expected to select the first printer as the target printer 20. In this case, at Step S140, the terminal apparatus 10 causes the first touch panel display 14 to display the list of the device names of the first and second printers.

In the above example, it is preferable for the user to select the first printer as the target printer 20 from the list. However, if the device (model) names of the first and second printers are identical or similar to each other, the user may mistakenly select the second partner as the target printer 20. If the user selects the second printer as the target printer 20, the terminal apparatus 10 causes the first touch panel display 14 to display an SSID list of access points 30 recognized by the second printer, and the second printer performs the Wi-Fi setting process, in accordance with the flowchart of FIGS. 2 and 3. To avoid such disadvantages to the user, the terminal apparatus 10 may include a third wireless communication unit that receives identification information from a communication partner. A terminal controller 11 in the terminal apparatus 10 may compare this identification information with identification information that the first wireless communication unit has received from the target printer 20. In accordance with the comparison result, the terminal controller 11 may cause the first touch panel display 14 to display the SSID list.

Herein, a first NFC unit 15 in the terminal apparatus 10 corresponds to the third wireless communication unit. Before the terminal apparatus 10 performs the process in the flowchart of FIG. 2, the user moves the terminal apparatus 10 toward a printer 20 to which the wireless connection control process is to be subjected. When terminal apparatus 10 is positioned adjacent to the printer 20, the first NFC unit 15 in the terminal apparatus 10 starts a short-distance wireless communication with a second NFC unit 26 in the printer 20. Through this communication, the first NFC unit 15 reads an identification number, such as a MAC address, of the printer 20 from the second NFC unit 26. Then, the terminal controller 11 stores the MAC address that the first NFC unit 15 has read from the second NFC unit 26.

In the process in the flowchart of FIG. 2, the terminal controller 11 compares the MAC addresses read by the first NFC unit 15 and acquired from a BLE Beacon signal emitted by a target printer 20. If the two MAC addresses match each other, the terminal controller 11 designates the printer 20 as the target printer 20 to be subjected by the user to the wireless connection control process and then performs the process in the flowchart of FIG. 2. If the two MAC addresses do not match each other, the terminal controller 11 terminates the process in the flowchart of FIG. 2, for example, at Step S160. In this case, the terminal controller 11 does not perform the process at Step S220, namely, does not cause the first touch panel display 14 to display the SSID list. Alternatively, if the two MAC addresses do not match each other, the terminal controller 11 may cause the first touch panel display 14 to display a UI screen containing a message that the two MAC addresses do not match each other, together with the SSID list, for example, at Step S220. Displaying the message in this manner can inform the user that the target printer 20 has been set unsuitably.

4. Third Embodiment

Figure 6:
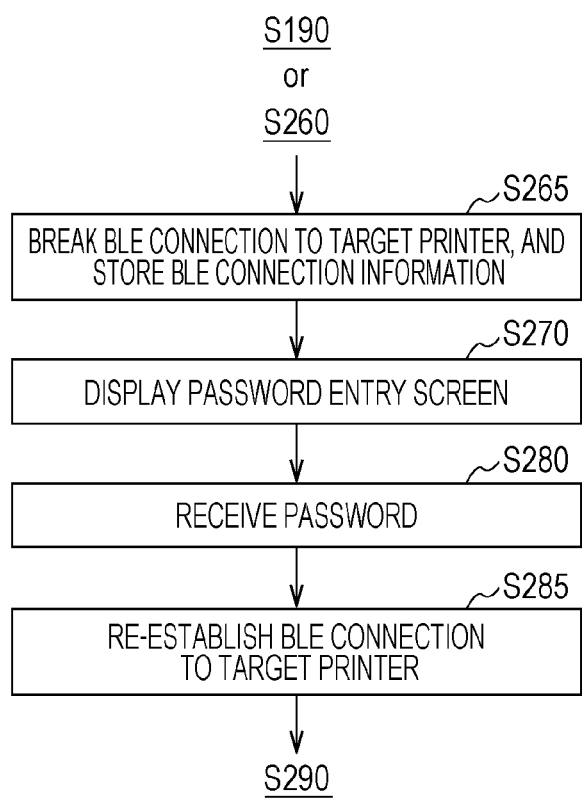
FIG. 6 is a flowchart of some steps in a wireless connection control process according to a third embodiment of the present disclosure.

Next, a third embodiment of the present disclosure will be described below with reference to FIG. 6. FIG. 6 illustrates a flowchart of some steps in a wireless connection control process that a terminal controller 11 in a terminal apparatus 10 performs in accordance with an application 11a in a terminal controller 11. Aside from Steps S265 and S285, the process of FIG. 6 is substantially identical to that of FIG. 2. In FIG. 6, the process steps the same as those in FIG. 2 are not illustrated. The process in the third embodiment will be performed together with the process in the foregoing first embodiment.

When selecting "Yes" at Step S190 or S260, the terminal controller 11 proceeds to the process at Step S265. At Step S265, the terminal controller 11 breaks the BLE connection between the terminal apparatus 10 and a target printer 20. More specifically, the terminal controller 11 causes the first BLE communication unit 12 to break the BLE connection currently established between a first BLE communication unit 12 in the terminal apparatus 10 and a second BLE communication unit 22 in the target printer 20. Furthermore, the terminal controller 11 stores BLE connection information in a predetermined storage unit at Step S265; the BLE connection information is required to establish the BLE connection between the first BLE communication unit 12 and the second BLE communication unit 22 in the target printer 20. This BLE connection information corresponds to the BLE Beacon information, such as identification information, contained in a BLE Beacon signal emitted from a target printer 20, as described in the process at Step S160 in the first embodiment. After the process at Step S265, the terminal controller 11 proceeds to the process at Step 270.

At Step S280, the terminal controller 11 receives a password as setting information and then proceeds to the process at Step S285. In this case, for example, a user may input the password in the terminal controller 11 through a password entry field 44a on a UI screen 44 and then operates an OK button on the UI screen 44. In response to this operation, the terminal controller 11 proceeds to Step S285.

At Step S285, the terminal controller 11 re-establishes the BLE connection between the terminal apparatus 10 and the target printer 20 which has been broken at Step S265. The process at Step S285 is substantially identical to the process at Step S160. At Step S285, however, the terminal controller 11 reads the BLE connection information that has been stored in the storage unit at Step S265 and then uses the BLE connection information to establish the BLE connection between the terminal apparatus 10 and the target printer 20. In this case, the terminal controller 11 does not have to receive the BLE Beacon signal again from the target printer 20 at Step S285. In short, at Step S285, the target printer 20 performs a process substantially identical to the process that has been performed at Step S410. After the process at Step S285, the terminal controller 11 proceeds to the process at Step S290.

The terminal controller 11 has difficulty predicting a period of time required for the user to input the password in the UI screen 44. In this third embodiment, the terminal controller 11 breaks the BLE connection between the terminal apparatus 10 and the target printer 20 at least over the period between when first touch panel display 14 displays the UI screen 44 and when the user inputs the password through the UI screen 44. In this case, the terminal apparatus 10 applies a timeout rule to the breakage of the connection. More specifically, after the first BLE communication unit 12 has established the BLE connection with the second BLE communication unit 22 in the target printer 20, if no data is transmitted through the BLE connection over a preset period, the first BLE communication unit 12 forcedly breaks the BLE connection. This preset period is referred to as the first preset period. Once the first BLE communication unit 12 breaks the BLE connection in accordance with the timeout rule, the terminal controller 11 keeps the BLE connection broken until at least a preset period has passed. This preset period is referred to as the second preset period. After the first BLE communication unit 12 has broken the BLE connection in accordance with the timeout rule, the target printer 20 stops the second BLE communication unit 22 from emitting a BLE Beacon signal and checks whether any system disadvantage arises due to the breakage of the BLE connection over the second preset period. In the third embodiment, the terminal controller 11 causes the first BLE communication unit 12 to forcedly break the BLE connection between the terminal apparatus 10 and the target printer 20 at the timing of Step S265. This can suppress the terminal controller 11 from breaking the connection in accordance with the timeout rule while the UI screen 44 is waiting for the password to be input by the user.

According to this embodiment, a terminal apparatus 10 includes a first wireless communication unit and a terminal controller 11. The first wireless communication unit conducts first wireless communication with a device under a first wireless communication scheme. The terminal controller 11 causes the first wireless communication unit to transmit setting information to the device; the setting information is required for the device to conduct second wireless communication under a second wireless communication scheme. When a predetermined display unit displays an entry screen through which the setting information is to be input, the terminal controller 11 breaks a connection of the first wireless communication between the first wireless communication unit and the device. When receiving the setting information through the entry screen, the terminal controller 11 establishes the connection of the first wireless communication between the first wireless communication unit and the device.

The above configuration can suppress an occurrence of a situation in which it is difficult to set the connection of the second wireless communication, such as to transmit the setting information to the device. More specifically, even after the first BLE communication unit 12 has broken the connection of the first wireless communication in accordance with a timeout rule during the period when the first touch panel display 14 displays the entry screen and when the user inputs the setting information through the entry screen, the first BLE communication unit 12 can promptly re-establish the connection. In this embodiment, after the first BLE communication unit 12 has broken the connection at the above timing, the terminal controller 11 re-establishes the connection in response to the reception of the setting information through the entry screen. In this way, the first wireless communication unit can promptly transmit the setting information to the device.

According to this embodiment, as described above, the first wireless communication unit may receive a list of access points 30 from the device. The access points 30 may be found by the device and support the second wireless communication scheme. Then, the terminal controller 11 may cause the display unit to display the received list. After one of the access points 30 in the list is selected, the terminal controller 11 may cause the first wireless communication unit to transmit the setting information to the device. This setting information may be required from the device to connect to the selected access point 30 under the second wireless communication scheme. The list of the access points 30 can translate into the SSID list described above, because the SSIDs are one type of the names of the access points 30 on a wireless communication network.

According to this embodiment, the terminal controller 11 may receive a password through the entry screen as the setting information. The password may be required to connect to the selected access point 30 under the second wireless communication scheme.

According to this embodiment, when breaking the connection of the first wireless communication between the first wireless communication unit and the device, the terminal controller 11 may store, in a predetermined storage unit, information required to establish the connection of the first wireless communication between the first wireless communication unit and the device. Then, the terminal controller 11 may use the information stored in the storage unit to re-establish the connection of the first wireless communication between the first wireless communication unit and the device. This configuration may improve the efficiency of a process at Step S285 in which the terminal controller 11 re-establishes the connection of the first wireless communication. In this case, the information required to establish the connection of the first wireless communication between the first wireless communication unit and the device is contained in a Beacon signal that the first wireless communication unit receives from the device.

5. Other Embodiments

A device that a terminal apparatus 10 subjects to a wireless connection control process is not limited to an MFP or a printer. Alternatively, the device may be a scanner unit, a facsimile unit, a projector, or other product.

What is claimed is:

1. A terminal apparatus comprising:
a first wireless communication circuit that conducts first wireless communication with a device under a first wireless communication scheme; and
a processor that causes the first wireless communication circuit to transmit setting information to the device, the setting information being required for the device to conduct second wireless communication under a second wireless communication scheme, wherein
the processor causes a connection of the first wireless communication with the device to be established,
after the connection of the first wireless communication is established with the device, the processor causes an entry screen to be displayed at a predetermined display,
during the displaying of the entry screen and before receiving the setting information through the entry screen, the processor breaks the connection of the first wireless communication between the first wireless communication circuit and the device, and
after receiving the setting information through the entry screen, the processor re-establishes the connection of the first wireless communication between the first wireless communication circuit and the device and sends the received setting information to the device via the re-established connection of the first wireless communication.

2. The terminal apparatus according to claim 1, wherein the first wireless communication circuit receives a list of access points from the device, the access points being found by the device, the access points supporting the second wireless communication scheme,
the processor causes the display to display the received list, and
after one of the access points in the list is selected, the processor causes the first wireless communication circuit to transmit the setting information to the device, the setting information being required from the device to connect to the selected access point under the second wireless communication scheme.

3. The terminal apparatus according to claim 2, wherein the processor receives a password through the entry screen as the setting information, the password being required to connect to the access point under the second wireless communication scheme.

4. The terminal apparatus according to claim 1, wherein when breaking the connection of the first wireless communication between the first wireless communication circuit and the device, the processor stores, in a predetermined storage unit, information required to establish the connection of the first wireless communication between the first wireless communication circuit and the device, and
the processor uses the information stored in the storage unit to establish the connection of the first wireless communication between the first wireless communication circuit and the device.

5. The terminal apparatus according to claim 4, wherein the information required to establish the connection of the first wireless communication between the first wireless communication circuit and the device is contained in a Beacon signal that the first wireless communication circuit receives from the device.

6. The terminal apparatus according to claim 1, wherein when no data is transmitted over a first preset period through the connection of the first wireless communication between the first wireless communication circuit and the device, the processor breaks the connection, and after breaking the connection in response to a fact that no communication data is present over the first preset period, the processor keeps the connection broken at least until a second preset period passes.

7. A wireless connection control method comprising:

a first wireless communication step of establishing a connection of a first wireless communication with a device under a first wireless communication scheme;

a display step of displaying, in a predetermined display, an entry screen through setting information is to be input, the setting information being required for the device to conduct second wireless communication under a second wireless communication scheme;

during the displaying of the entry screen and before receiving input of the setting information through the entry screen, a connection breakage step of breaking the connection of the first wireless communication with the device; and a reconnection step of re-establishing the connection of the first wireless communication with the device when the setting information is input through the entry screen; and a connection control step of transmitting the setting information input through the entry screen to the device via the re-established connection of the first wireless communication.

8. A non-transitory computer-readable storage medium storing a wireless connection control program, the wireless connection control program comprising:

a first wireless communication function of establishing a connection of a first wireless communication with a device under a first wireless communication scheme;

a display function of displaying, in a predetermined display, an entry screen through setting information is to be input, the setting information being required for the device to conduct second wireless communication under a second wireless communication scheme;

during the displaying of the entry screen and before receiving input of the setting information through the entry screen, a connection breakage function of breaking the connection of the first wireless communication with the device;

a reconnection function of establishing the connection of the first wireless communication with the device when the setting information is input through the entry screen; and a connection control function of transmitting the setting information input through the entry screen to the device via are-established connection of the first wireless communication.

* * * * *